March 4, 1952  H. A. KUEHNE  2,587,631
APPARATUS FOR MEASURING AND DETECTING MAGNETIC OBJECTS
Filed May 21, 1948  2 SHEETS—SHEET 1
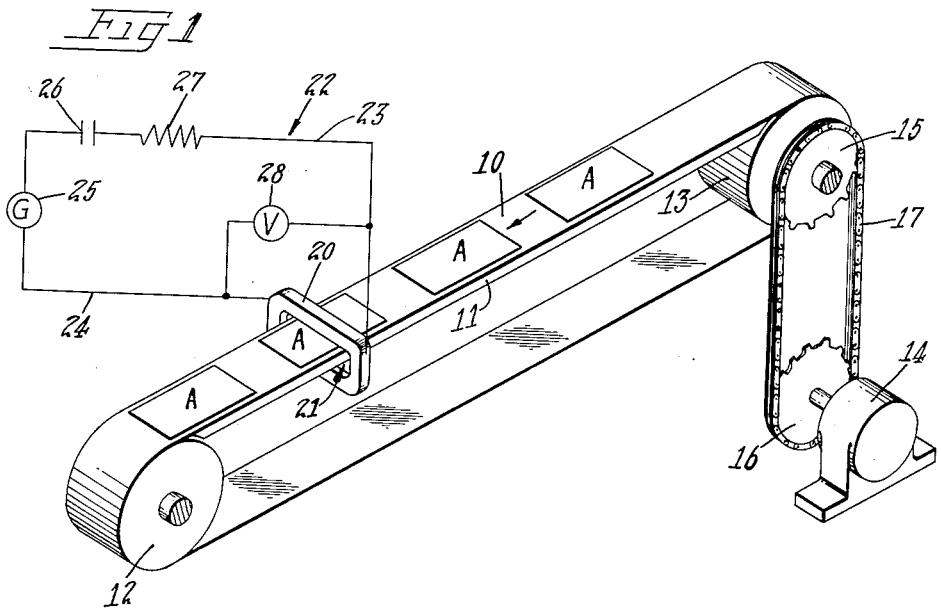
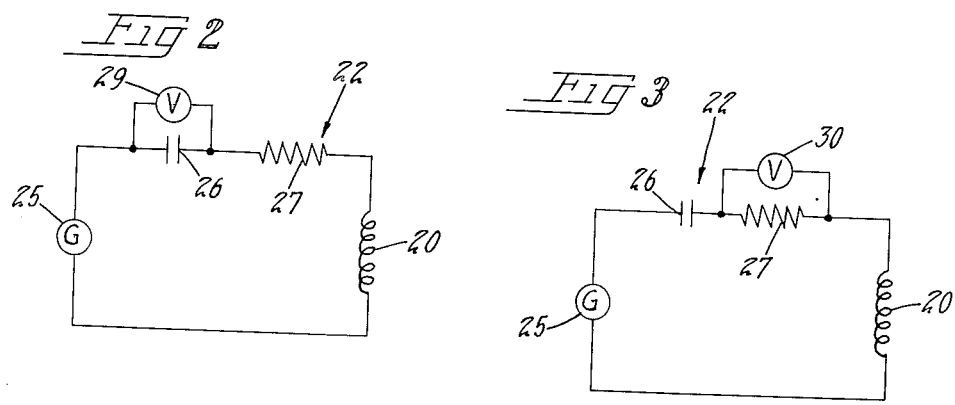
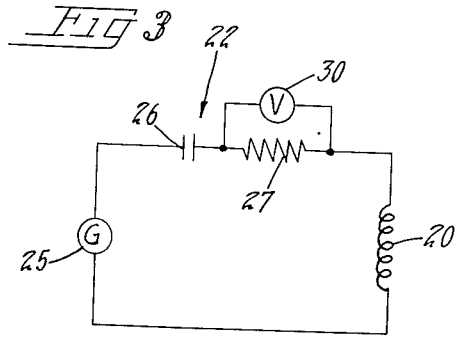
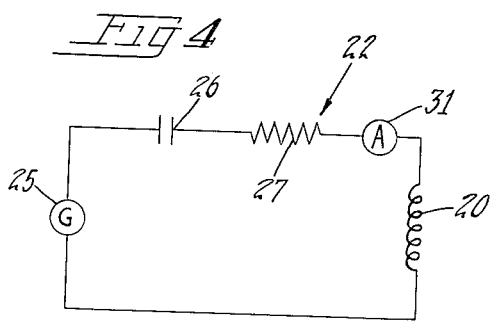
INVENTOR.
Herbert A. Kuehne
BY Ivan D. Thornburgh
Charles H. Gune
ATTORNEYS

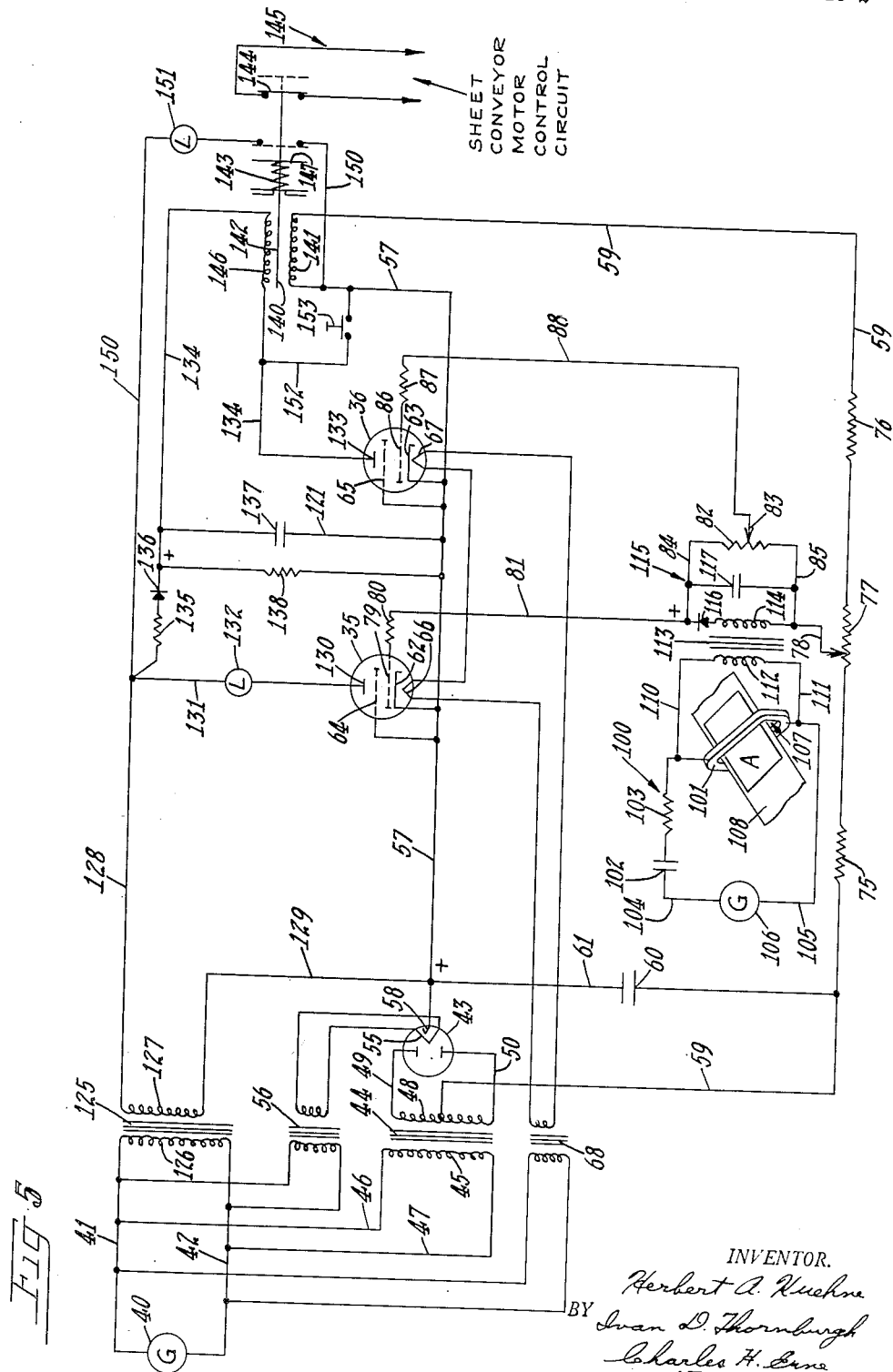

Patented Mar. 4, 1952

2,587,631

UNITED STATES PATENT OFFICE 2,587,631

APPARATUS FOR MEASURING AND DETECTING MAGNETIC OBJECTS

Herbert A. Kuehne, Maywood, Ill., assignor to American Can Company, New York, N. Y., a corporation of New Jersey Application May 21, 1948, Serial No. 28,423

3 Claims. (Cl. 175—183)

The present invention relates to a method of and apparatus for measuring or gauging magnetic objects and has particular reference to a method and device which is particularly adapted to detect magnetic sheets which vary from a predetermined standard of thickness.

In many industries wherein articles are made from magnetic stock such as sheet iron or tin plate, it is necessary to provide devices to measure the thickness of the sheets before they are fed into printing or fabricating machines in order to prevent the feeding of over-thick sheets which would damage the machines or result in manufactured articles of off-standard quality.

At the present time, most of the devices which are utilized to gauge magnetic sheets for thickness rely upon mechanical feelers which contact the sheets in order to effect the gauging operation. While such devices on the whole are fairly satisfactory, they do have inherent disadvantages which detract from their efficiency. These disadvantages include inaccuracies due to mechanical wear of the contacting parts, and inaccuracies resulting from contact by the mechanical feeler with minor imperfections such as burred or drip edges or dents in acceptable sheets which are of the required thickness but are nevertheless consequently rejected as being off-gauge.

The instant invention overcomes these objections by providing a method of and apparatus for measuring the thickness of magnetic sheet materials wherein the magnetic permeability of the sheets being gauged is utilized to produce a reliable and highly sensitive gauging operation.

According to this invention, the sheets to be gauged are passed through a detector coil which forms the inductor of a fixed-frequency, constant-potential series resonant circuit. The presence of the magnetic material within the detector coil results in an increment in the inductive reactance of the coil with the result that the series resonant circuit is made to approach resonance. As the circuit approaches resonance, there is a large rise in the voltage across the detector coil and this voltage is utilized as a signal voltage to give a highly accurate indication of the sheet thickness. This same effect will be had if the magnetic material is brought into proximity to but not passed into the core of the coil, although the sensitivity of the measuring operation and apparatus will be somewhat reduced.

The voltage across the inductor of a series resonant circuit at resonance=

$$\frac{E 2\pi f L}{R}$$

where

E=voltage applied to circuit
$f$=frequency in cycles
L=inductance in henrys
R=effective series resistance of tuned circuit In the present invention a fixed-frequency, constant-potential series resonant circuit having a fixed capacitor and series resistor is provided. As the inductance is made to approach its resonance value to thereby tune the circuit towards resonance, the voltages across the inductance coil, across the capacitor and across the series resistor rise sharply. There is also a corresponding sharp rise in the amperage in the circuit.

The voltages across the inductor and the capacitor can both be made considerably greater than the applied voltage when the circuit is in the vicinity of resonance. This is possible because the voltages across the inductor and the capacitor are nearly 180 degrees out of phase with each other and so add up to a value that is smaller than either voltage alone.

The circuit components are preferably so selected that the greatest possible variations in the thickness or, in the case of multiple sheets, number of sheets encountered in the normal operation of the apparatus, will produce signal voltages all of which fall within that portion of the resonance curve of the circuit wherein the voltage across the inductance coil undergoes its sharpest rise as it rises to its highest value (at resonance). This makes it possible to obtain a relatively great increment in signal voltage from only a slight increment in sheet thickness. If so desired, the signal voltage increment can be made substantially proportional to the sheet thickness increment if a substantially straight line portion of the curve is utilized.

Care should be taken to avoid creating inductance values exceeding the inductance value at resonance, except in special cases, since the signal voltages will drop as soon as resonance is passed and will not be a reliable indication of the increasing thickness of the sheet material being gauged.

The change in the inductive reactance of the resonant circuit is brought about by the magnetic properties of the magnetic stock which is placed within the center of the detector coil and which functions as a magnetic core. The basic factors in determining these magnetic properties are of course the mechanical dimensions (length, width, thickness) and the physical and chemical characteristics of the stock which affect its magnetic permeability. It thus follows that any one of these basic factors may be accurately measured by means of the instant invention provided the others remain constant. In order to obtain an accurate gauging of the thickness of successive sheets it is necessary that the sheet thickness be the only variable factor affecting the inductance of the detector coil. Hence the sheets to be gauged should preferably be uniform in length, width and in their physical and chemical characteristics. Conversely, it is also possible to accurately gauge the width of sheets in which the other mechanical dimensions and the physical and chemical characteristics remain constant.

However, reasonable variations in the length of the sheets being passed through the detector coil, while not particularly desirable, are usually permissible since the maximum signal voltage will not be obtained until the sheet is well within the coil. When the sheet is so situated, its ends are normally considerably removed from the magnetic field of the coil, since in general practice the length of the sheet greatly exceeds the length of the coil, and does not exert any appreciable influence on its inductance. It is because of this that the present invention is also capable of use with strip or web stock.

It should be apparent that the method and apparatus of this invention may be also utilized to measure the magnetic variations due to variables in the physical and/or chemical characteristics of a given batch of sheets to determine whether or not they meet metallurgical standards. In order to obtain a true signal voltage when this type of measurement is desired, it is of course necessary that the mechanical dimensions, particularly the thickness and width of the sheets, be uniform.

An object of the present invention is the provision of a method of and apparatus for electrically gauging magnetic sheet or web stock such as tin plate or the like accurately and rapidly without the necessity of mechanically contacting the materials, thereby precluding the marring or scratching of their surfaces.

Another object is the provision of an apparatus for measuring the thickness of magnetic sheets wherein the accuracy of the measurement is unaffected by the small imperfections, such as bent or burred edges, dents, or drip edges, which are normally present in a certain percentage of the sheets.

Still another object of the invention is the provision of a sensitive electric measuring and detecting apparatus based upon a series resonant circuit which can be easily and inexpensively constructed of a few simple components and which is easy to maintain.

Yet another object of the invention is to provide a method of and apparatus for gauging magnetic objects wherein the objects to be gauged are brought into proximity to the inductor of a series resonant circuit in order to alter the inductive reactance of the circuit.

A further object of the invention is to provide a method of measuring and/or detecting magnetic objects by utilizing a series resonant circuit to produce a signal voltage, the method being adaptable for use in a great variety of machines such as thickness gauging machines, sorting machines, double or multiple sheet detectors, and testing machines.

A still further object is to provide an electric sheet measuring apparatus which utilizes a differential potentiometer arrangement to indicate the presence of over-thick or multiple sheets.

Numerous other objects and advantages of the invention will be apparent as it is better understood from the following description, which, taken in connection with the accompanying drawings, discloses a preferred embodiment thereof.

Referring now to the drawings:

Figure 1 is a view, partly diagrammatic and partly in perspective, showing an embodiment of the instant invention which is adapted to give a visual indication of the thickness of successive sheets as they are fed along a path of travel on a conveyor.

Figs. 2, 3 and 4 are wiring diagrams illustrating three modified ways in which measurements of sheet thicknesses may be obtained from the series resonant circuit of Fig. 1, and Fig. 5 is a view, partly diagrammatic and partly in perspective, showing an exemplary embodiment of the instant invention wherein electric circuits are utilized to stop a conveyor when an over-thick sheet is detected.

As an exemplary embodiment of the present invention, Fig. 1 of the drawings discloses a gauging apparatus wherein magnetic sheets A, substantially uniform in all respects except thickness, are fed along a straight line path of travel on an endless belt or conveyor 10 constructed of nonmagnetic material. The conveyor 10 is preferably operated continuously, and is so shown, but may, if desired, be of the intermittent type. It is supported on a nonmagnetic table plate 11 and operates around a pair of pulleys 12 and 13. Pulley 13 is a driving pulley, and is driven from a motor 14 through a pair of driving sprockets 15, 16 and a drive chain 17.

The sheets A are placed upon the conveyor 10 in any convenient manner. As they are conveyed along in the direction indicated by the arrow in Fig. 1, the sheets A pass through a solenoid or detector coil 20. The detector coil 20 consists of a suitable number of turns of insulated wire, and is formed with an open core 21. The coil 20 closely surrounds the conveyor 10 and the table plate 11, the upper clearance, however, being made sufficient to permit the sheets A to pass unobstructedly through the core 21 even though they possess minor imperfections such as bent edges, etc.

The detector coil 20 forms the inductor of a series resonant circuit which is designated generally by the numeral 22. The windings of the detector coil 20 are connected through wires 23, 24 to a source of fixed-frequency, constant-potential alternating current, in this instance shown as a generator 25. The other components of the series resonant circuit include a capacitor or condenser 26 and a series resistor 27.

When the magnetic sheets A pass through the core 21 of detector coil 20, the inductance of the coil is increased, and the circuit 22 is thereby made to closely approach resonance. This results in a sharp rise in the voltage across the ends of the detector coil 20. A voltmeter 28 is connected across the ends of the coil 20 and gives a direct visual indication of this voltage, which in this exemplary embodiment of the invention is utilized as a signal voltage.

By passing sheets of substantially identical dimensions except varying thicknesses through the coil 20, signal voltage variations corresponding to the thickness variations of the sheets may be determined. These values when once known are used by an operator to reject in any manner sheets which are either too thin or too thick. If desired, the voltmeter may be scaled to give a direct reading of the sheet thickness.

As the series resonant circuit 22 approaches resonance, there are marked voltage rises across the capacitor 26 and across the series resistor 27, in addition to the voltage rise across the inductor 20. While for various reasons it is preferable to measure the voltage across the inductor 20, it is also possible to get an indication of the sheet thickness by utilizing the voltage across either the capacitor 26 or the resistor 27 as a signal voltage.

Fig. 2 discloses the series resonant circuit 22 of Fig. 1, wherein a suitable, preferably non-inductive voltmeter 29 is connected across the capacitor 26.

In Fig. 3, a voltmeter 30 is shown connected across the series resistor 27.

In each modification the signal voltage readings may be correlated to the thickness of the sheets passed through the inductor 20 to obtain an accurate index of measurement for the sheet thicknesses. At resonance, the voltages across the capacitor 26 and across the inductor 20 will be substantially equal and may exceed the voltage applied to the circuit, depending upon the relative magnitudes of the resistance and the inductive and capacitative impedances. The voltage across the resistor 27 will rise sharply as in the case of the voltages across the inductance coil and the capacitor, to produce a voltage signal but can never exceed the voltage supplied by the generator 25.

In another modification, shown in Fig. 4, an ammeter 31 is connected into the circuit 22 to give a direct reading of the rise in amperage in the circuit as it approaches resonance. This amperage, as is the case with the voltages, rises sharply as the circuit approaches resonance and varies with the thickness of the sheets being measured, and so may be utilized as a signal to give an accurate index of sheet thickness.

Fig. 5 illustrates an embodiment of the present invention wherein the signal voltage from the detector coil is utilized to stop the operation of a sheet conveyor whenever a multiple sheet or a sheet having a thickness which exceeds a predetermined limit is passed through the detector coil.

This is accomplished by having the signal voltage control the firing of two shield grid thyratron tubes 35 and 36 (Fig. 5) in such a manner that thyratron tube 35 fires whenever a standard sheet is present within the detector coil and both the thyratron tubes 35 and 36 fire whenever an over-thick sheet is present. The firing of thyratron tube 36 results in the opening of a circuit which controls the operation of the conveyor drive motor 14 and thus stops the conveyor so that the over-thick sheet can be removed.

The electric circuits utilized for this thickness gauging operation will now be explained and reference should be had to the wiring diagram in Fig. 5. A source of alternating current, here shown as a generator 40, provides the power for various of the electric circuits through the two main lead wires 41, 42.

The grid bias voltages for the thyratron tubes 35, 36 are obtained by means of a full wave rectifier circuit. This circuit includes a full wave rectifier tube 43 which operates in conjunction with a center tapped transformer 44 to supply a pulsating but continuous output voltage. The primary winding 45 of the transformer is connected to the A. C. lead wires 41, 42 through wires 46, 47.

The secondary winding 48 of the transformer 44 is connected by wires 49, 50 to the rectifier tube 43. Electric current for the heater 55 of the rectifier tube 43 is furnished through a transformer 56.

The rectifier circuit also includes a lead wire 57 connected to the cathode 58 of the rectifier tube 43 and a return wire 59 which taps the center of the secondary winding 48 of the transformer 44. A condenser 60 is placed across wires 57 and 59 in a cross wire 61 and functions to smooth out the ripples in the voltage in the rectifier circuit.

The cathodes 62, 63 and the shield grids 64, 65 of the thyratrons 35, 36 respectively, are connected into the rectifier circuit wire 57. The respective heaters 66, 67 are joined in series and are supplied with electric current through a transformer 68.

The wire 59 has connected into it suitable resistors 75, 76 and a control potentiometer 77 having a movable arm 78. The control grid 79 of thyratron 35 is connected through a resistor 80 and wire 81 to the control potentiometer arm 78.

A second or differential potentiometer 82 having a movable arm 83 is connected into the wire 81 by means of wires 84, 85. The control grid 86 of thyratron tube 36 is connected to the differential potentiometer arm 83 through a resistor 87 and a wire 88.

It will be apparent from the wiring diagram that in the absence of signal voltage the basic grid biases for both the thyratron tubes 35 and 36 will be determined by the voltage drop between the setting of the control potentiometer arm 78 and the thyratron cathodes 62 and 63 and will be substantially the same in both tubes.

In actual operation of this apparatus, however, there will always be present a signal voltage to govern the actual grid biases and thus to control the firing of the thyratrons 35, 36.

This signal voltage is supplied by a series resonant circuit generally indicated by the numeral 100. The circuit 100 is essentially similar to the series resonant circuit 22 hereinbefore described in connection with Fig. 1. It consists of an inductor or detector coil 101, a capacitor 102, and a resistor 103, all of which are placed in series and connected by lead wires 104, 105 to a source of fixed-frequency, constant-potential alternating current, here indicated as a generator 106.

As shown in Fig. 5, the alternating current for the series resonant circuit 100 is obtained from a separate source of supply, in this case generator 106, but it should be understood that as an alternative, this current can be obtained from the hereinbefore mentioned generator 40. If this is done, the lead wires 104, 105 would be joined to wires 41, 42 either directly or through a transformer, whichever is the more suitable to the particular circuit requirements.

The solenoid or detector coil 101 is similar in construction to the previously mentioned coil 20, and is formed with an open core 107 through which moves a conveyor belt 108 (shown fragmentally) carrying the sheets A to be measured. The ends of the detector coil 101 are connected by wires 110, 111 to the primary winding 112 of a transformer 113. The secondary winding 114 of the transformer 113 is connected into the grid control wire 81 between the wires 84 and 85. It should be understood that the inductance of the transformer windings will affect the inductance of the series resonant circuit 100 and adequate allowance must be made therefore in designing the circuit.

The voltage drop across the ends of the detector coil 101 is utilized by the primary winding 112 as a signal voltage to induce a voltage in the transformer secondary winding 114 which forms a part of a closed signal circuit designated as 115, which circuit also includes wires 84 and 85 and the differential potentiometer 82.

A selenium rectifier 116 is placed in the wire 81 in order to prevent the building up of voltages on the grids 79, 86 of the thyratron tubes 35, 36 to values above the safety factor of the tubes. To smooth out the ripple in the rectified voltage in the signal circuit 115, a condenser 117 is placed across the wires 84, 85.

From the above description it will be apparent that as long as current flows in the series resonant circuit 100, a voltage is induced in the signal circuit 115 which opposes and thus reduces the basic grid biases on the thyratron tubes 35, 36. This is true even though no sheet be present within the detector coil 101. The full value of this voltage is always applied to reduce the grid bias of the thyratron tube 35. However, the differential potentiometer 82 is adjusted so that only a part of this voltage is applied to reduce the grid bias of the thyratron tube 36, thus creating a differential between the grid biases on the thyratrons 35 and 36. It is through this grid bias differential that selective firing of the thyratron tubes 35, 36 is effected, as will shortly be described.

The anode to cathode circuit of the thyratrons 35, 36 includes a transformer 125, the primary winding 126 of which is connected to the leads 41 and 42. The secondary winding 127 is connected at one end to a wire 128 and at the other end to a wire 129. Wire 129 connects with the wire 57 which in turn is connected to the thyratron cathodes 62 and 63.

The plate or anode 130 of the thyratron tube 35 is connected to wire 128 by a wire 131 containing an indicating lamp 132. The plate 130 will have an alternating voltage imposed upon it by the transformer 125 and will be positive with respect to its cathode 62 only during half of each cycle.

The plate or anode 133 of the thyratron tube 36 is connected to wire 128 through a wire 134 and a resistor 135. In order to make the plate 133 constantly positive with respect to its cathode 63, a selenium rectifier 136 is placed in wire 134 and a condenser 137 and a suitable bleeder resistor 138 are connected across wire 134 and wire 57.

A description of the manner in which the thyratron tubes 35 and 36 are fired will now be given. As previously explained, the various electrical circuits shown in Fig. 5 are set so that in normal operation the thyratron tube 35 will fire when a standard sheet is fed through the detector coil 101, and both the thyratron tubes 35 and 36 will fire when an over-thick sheet is fed. In order to determine these settings, the first step is to place a standard sheet within the detector coil 101.

The resonant circuit 100 is thereby made to approach resonance, with the result that the signal voltage is greatly increased and the grid bias voltages on both the thyratron tubes 35 and 36 are reduced. The movable arm 78 of control potentiometer 77 is now adjusted to further reduce the grid bias voltages on both thyratrons until thyratron 35 fires, thereby lighting the indicator light 132. Electric current now flows from the plate 130 to the cathode 62 of thyratron 35, and thence through wires 57 and 129, the transformer winding 127, wire 128, and wire 131 and indicator lamp 132 back to the plate 130.

If the full voltage which is induced in the signal circuit when a standard sheet is present in the detector coil 101 were applied against the grid bias of the thyratron tube 36, it would fire simultaneously with the thyratron tube 35. The thyratron tube 36, however, does not fire when a standard sheet is present within the detector coil 101 because the differential potentiometer 82 makes only a portion of this voltage available to it to reduce its grid bias.

The thyratron 36 can therefore be made to fire only when a higher signal voltage is supplied by the detector coil 101 to compensate for the unused portion of the induced voltage in the signal circuit due to the differential potentiometer 82. This increase in signal voltage is produced as the resonant circuit 100 is made to more nearly approach resonance by an increase in the thickness of the magnetic sheet within the coil.

The voltage increment or differential necessary to cause the thyratron 36 to fire is determined by the setting of the differential potentiometer 82. Hence, the standard sheet is removed from the detector coil 101 and the potentiometer 82 is now set to permit the thyratron 36 to fire whenever a sheet which exceeds a maximum allowable thickness is present within the detector coil 101. The thickness increment between acceptable and non-acceptable sheets may thus be varied by a simple adjustment of the differential potentiometer 82.

When the thyratron tube 36 fires as a result of the presence of an over-thick sheet in the detector coil 101, current flows from its anode 133 to its cathode 63, and thence through wires 57 and 129, transformer winding 127, and wires 128 and 134 back to the anode 133. This flow of current is utilized to operate a double wound control relay 140 to stop the conveyor 108 so that the over-thick sheet may be removed.

The relay 140 includes a winding 141 which is connected between wires 57 and 59 in the rectified circuit, and thus is continuously kept energized. When so energized, winding 141 attracts and holds the relay armature 142 in its normal operative position (to the left as shown in Fig. 5) against the pressure of a compression spring 143. In this position, the outer switch 144 of the relay is closed, thus maintaining the flow of current in the motor circuit generally designated by the numeral 145, which circuit controls the motor which drives the sheet conveyor 108. The conveyor is thereby kept in operation and a constant flow of sheets A is insured.

A second relay winding 146, which is placed in wire 134 and which opposes winding 141, is energized when the thyratron tube 36 fires, with the result that the magnetic effect of winding 141 is neutralized and the spring 143 moves the relay armature 142 to the right (as indicated in broken lines in Fig. 5) thus opening the switch 144 and stopping the conveyor.

This movement of the relay armature 142 also closes an inner switch 147, resulting in the flow of current through a wire 150 which is connected across wires 128 and 57. An indicating lamp 151, placed in wire 150 furnishes a visual indication of the firing of the thyratron tube 36 and thus of the presence of an over-thick sheet within the detector coil 101.

As hereinbefore explained, the thyratron 35 has alternating voltage on its plate 130, and thus will cease to conduct as soon as the magnetic sheet which caused it to fire is withdrawn from the detector coil 101. The plate 133 of thyratron 36 is, however, always positive with respect to its cathode 63, and thus, when once fired, will continue to conduct until the plate voltage is sufficiently reduced. To make possible this reduction, a wire 152 containing a normally open reset push button 153 is placed across wires 57 and 134.

To break the anode-to-cathode circuit of thyratron 36 and restart the conveyor after the over-thick sheet has been removed, the push button 153 is first closed to destroy the voltage on plate 133, and thus stop the flow of current through the thyratron 36. The current now bypasses the thyratron 36 through wire 152 and continues to flow through the relay winding 146.

The push button 153 is next released, thus breaking the flow of current through the relay winding 146 and permitting the relay winding 141 to move the armature 142 to the left, thus closing the switch 144 and restarting the conveyor motor, and opening the switch 147 to extinguish the indicating lamp 151.

It will be apparent from the foregoing description that the measuring and detecting apparatus illustrated in Fig. 5 gives an indication of the thickness of each sheet which passes through the detector coil 101. Neither of the thyratron tubes 35, 36 fires when a sheet which is of less than standard thickness is present within the detector coil, with the result that neither of the indicating lamps 132, 151 lights. Such a sheet is allowed to continue on since it will not cause damage to subsequent machinery.

The presence of a standard sheet is indicated when only the lamp 132 lights, while an over-thick sheet causes both the lamps 132 and 151 to light and also results in the breaking of the motor control circuit of the sheet conveyor and the consequent stopping of the conveyor.

The apparatus is of course perfectly adapted to function as a multiple sheet detector. When a plurality of sheets are fed simultaneously, they have an effect upon the inductance of the series resonant circuit 100 similar to that of an over-thick sheet, with the result that both the lamps 132 and 151 light and the conveyor is stopped.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. An apparatus for measuring the thickness of magnetic stock, comprising a series resonant circuit including an inductor in the form of an open-core detector coil for supplying a signal voltage, the magnitude of which varies with the thickness of the magnetic stock when said stock is passed directly through the open core of said detector coil, conveyor means for moving said stock through said open core of said detector coil, a pair of thyratron tubes associated with said series resonant circuit, means for impressing on the grid bias of each of said thyratron tubes a voltage whose magnitude is responsive to the variation in said signal voltage, means for adjusting the grid bias on the first of said thyratron tubes so that it will conduct when material which is at least of standard thickness is moved through said detector coil, and means for adjusting the grid bias of the second of said thyratron tubes so that it will conduct only when material which exceeds the predetermined standard of thickness is moved through said detector coil.

2. An apparatus for measuring thickness of magnetic stock, comprising a series resonant circuit including an inductor in the form of an open-core coil for supplying a signal voltage, the magnitude of which varies with the thickness of the magnetic stock when said stock is passed directly through the open core of said detector coil, conveyor means for moving said stock through said open core of the detector coil, a first thyratron tube and a second thyratron tube, means for imposing said signal voltage onto the control grid of said first thyratron tube and a differential signal voltage onto the control grid of said second thyratron tube, means for conducting an alternating current to the anode of said first thyratron tube and a rectified current to its cathode, a signal device in the exterior anode to cathode circuit of said first thyratron tube said signal device being operable by current passing through the circuit when conduction in said first tube is effected by signal voltage created by stock of predetermined thickness passing through said open-core coil, means for applying rectified current to both the anode and the cathode of said second thyratron tube, conveyor control means in the exterior anode to cathode circuit of said second thyratron tube for controlling operation of said conveyor, said differential signal voltage imposed upon the control grid of said second thyratron tube being sufficient to produce conduction in the tube for closing its anode to cathode circuit to initiate operation of said control means when the magnetic stock passing through said open-core coil exceeds said predetermined thickness, and means for discontinuing conduction in said second tube to open its anode to cathode circuit after removal of said stock of excessive thickness from said open-core coil.

3. An apparatus for measuring the thickness of magnetic stock, comprising a series resonant circuit, a first thyratron tube and a second thyratron tube associated with said resonant circuit, measuring means including an open inductor coil in said resonant circuit for supplying to both of said thyratron tubes a signal voltage the magnitude of which varies in accordance with variations in the thickness of the stock, means for conveying said stock directly through said open inductor coil, a control potentiometer for adjusting the basic grid biases on both of said thyratron tubes, a differential potentiometer for further adjusting the grid bias on said second thyratron tube so that the latter conducts only in response to a greater signal voltage than is required to cause said first thyratron tube to conduct, a conveyor circuit having a conveyor control switch connected therewith for stopping and starting said conveyor, an indicator circuit having an indicating device and an indicator switch connected in series therein, a control relay having a first and a second winding and an armature united with said switches, said armature being mechanically biased to maintain said conveyor control switch open and said indicator switch closed, said first winding being energized continuously for biasing said control armature in opposition to said mechanical bias for maintaining said indicator switch open and said conveyor control switch closed while current is being supplied to the apparatus, said second winding being connected in series in the exterior anode to cathode circuit of said second thyratron tube whereby, upon conduction in said second tube, said second winding is energized for neutralizing the effect of said first winding so that the mechanical bias of said armature opens said conveyor control switch and closes said indicator switch for stopping said conveyor and for energizing said indicating device when over-thick stock is present in said inductor coil.

HERBERT A. KUEHNE.

REFERENCES CITED

The following references are of record in the file of this patent:

UNITED STATES PATENTS

| Number | Name | Date |
| --- | --- | --- |
| 1,640,524 | Augustine | Aug. 30, 1927 |
| 1,943,619 | Mudge et al. | Jan. 16, 1934 |
| 1,946,924 | Allen et al. | Feb. 13, 1934 |
| 1,957,222 | Mershon | May 1, 1934 |
| 1,983,388 | Moore | Dec. 4, 1934 |
| 2,071,607 | Bjorndal | Feb. 23, 1937 |
| 2,222,221 | Burford | Nov. 19, 1940 |
| 2,228,294 | Wurzbach | Jan. 14, 1941 |
| 2,312,357 | Odquist et al. | Mar. 2, 1943 |
| 2,331,418 | Nolde | Oct. 12, 1943 |
| 2,349,992 | Schrader | May 30, 1944 |